US011275982B1

(12) United States Patent
Landry et al.

(10) Patent No.: US 11,275,982 B1
(45) Date of Patent: Mar. 15, 2022

(54) FARADAY ENCLOSURE FOR IMPROVED RFID DETECTION

(71) Applicant: C & A Associates, Inc., Denham Springs, LA (US)

(72) Inventors: Roland Dustin Landry, Denham Springs, LA (US); Carey S. Solomon, Gonzales, LA (US); James S. Brown, Saint Amant, LA (US)

(73) Assignee: C & A Associates, Inc., Denham Springs, LA (US)

( * ) Notice: Subject to any disclaimer, the term of this patent is extended or adjusted under 35 U.S.C. 154(b) by 0 days.

(21) Appl. No.: 16/914,837

(22) Filed: Jun. 29, 2020

(51) Int. Cl.
*G06K 19/073* (2006.01)
*G07C 9/00* (2020.01)
*H01Q 1/22* (2006.01)

(52) U.S. Cl.
CPC ... *G06K 19/07327* (2013.01); *G07C 9/00912* (2013.01); *H01Q 1/2225* (2013.01)

(58) Field of Classification Search
CPC ......... G06K 19/07327; G07C 9/00912; H01Q 1/2225
See application file for complete search history.

(56) References Cited

U.S. PATENT DOCUMENTS

| | | | |
|---|---|---|---|
| 7,714,708 B2 * | 5/2010 | Brackmann | B60P 3/14 340/539.1 |
| 9,673,025 B2 | 6/2017 | Benjamin et al. | |
| 9,825,662 B2 * | 11/2017 | Mian | H01Q 1/526 |
| 9,827,064 B2 * | 11/2017 | DeBusk | A61B 50/36 |
| 10,609,845 B2 | 3/2020 | Elizondo, II | |
| 2010/0213086 A1 * | 8/2010 | Emond | G06K 19/07327 206/232 |

* cited by examiner

*Primary Examiner* — Seung H Lee
(74) *Attorney, Agent, or Firm* — Jones Walker, LLP

(57) ABSTRACT

An RFID reading enclosure having a Faraday cage including a cage floor and a cage hood hinged to the cage floor. The cage hood includes a RF blocking fabric formed on a frame with the interior of the Faraday cage having a volume between 4.5 and 30 ft³. There are at least two RFID antennas positioned to transmit signals into the Faraday cage, with the two RFID antennas having a transmission axis along different orientations.

22 Claims, 7 Drawing Sheets

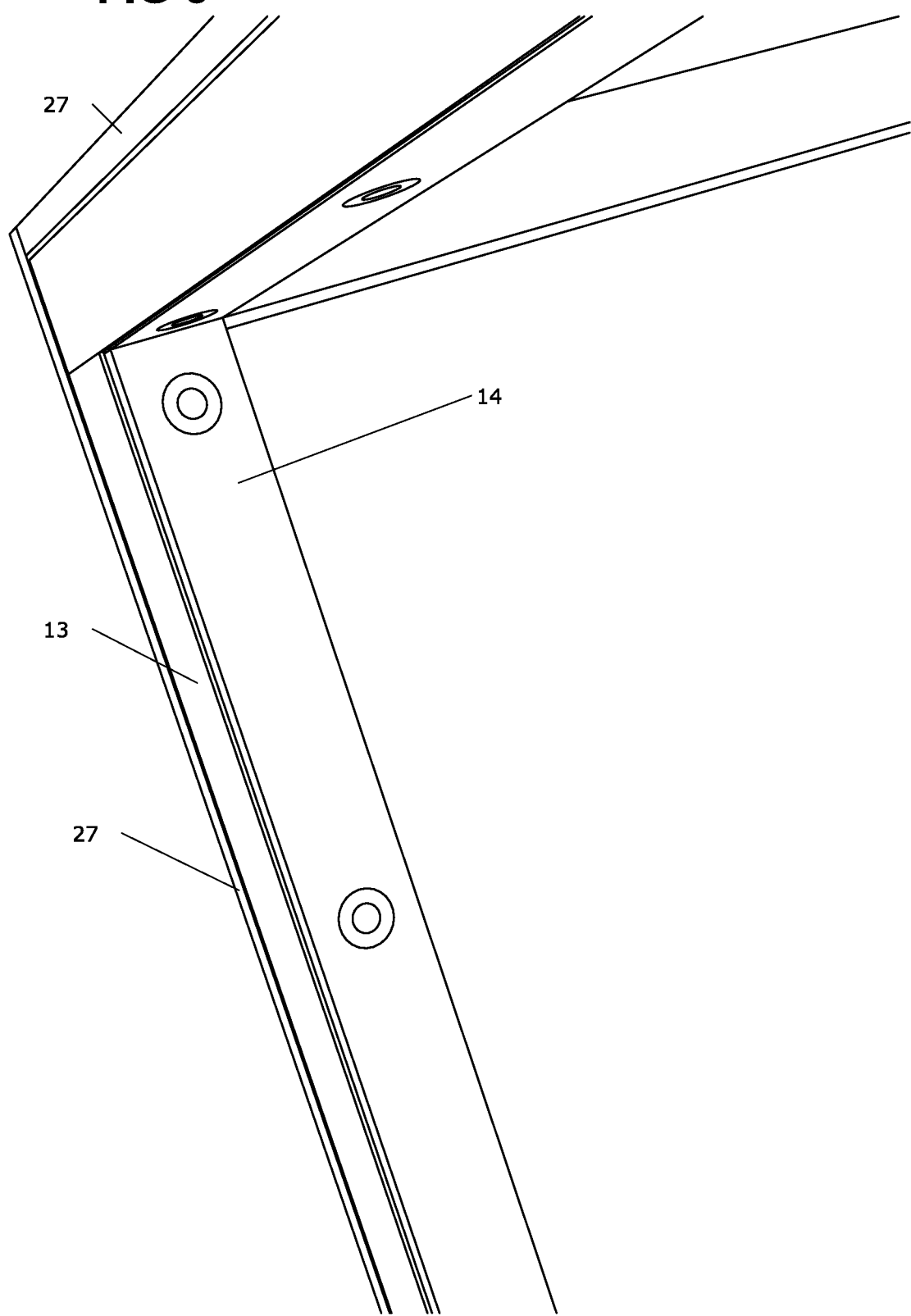

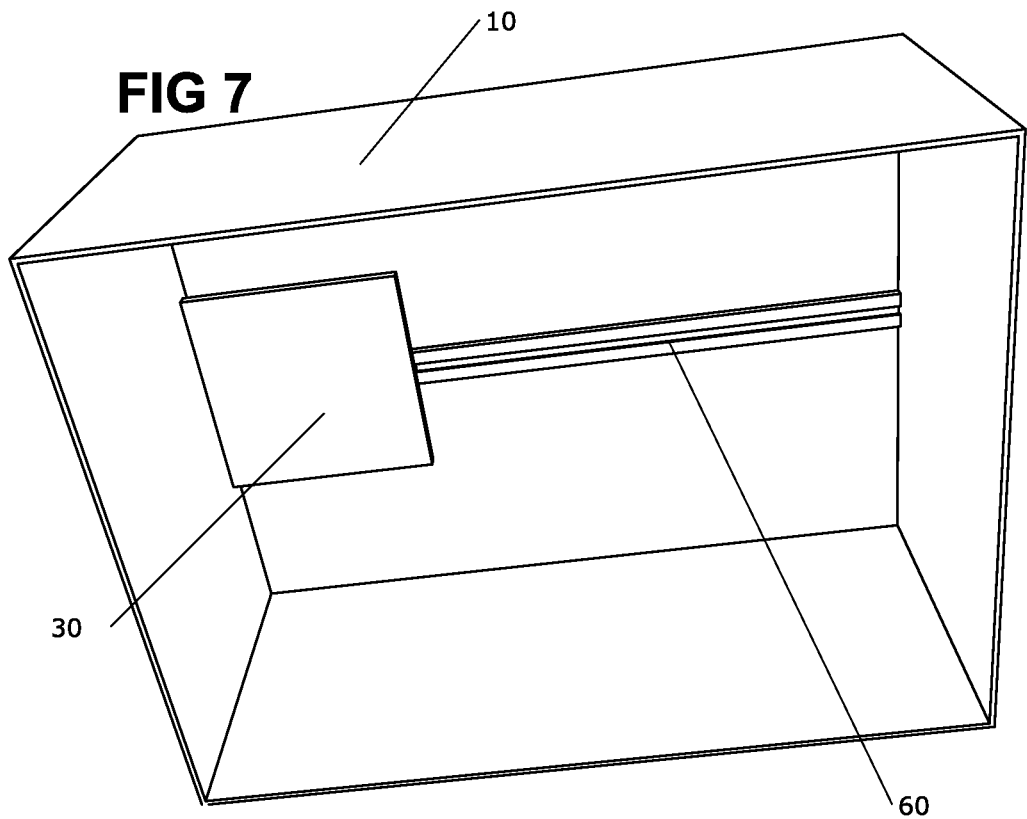
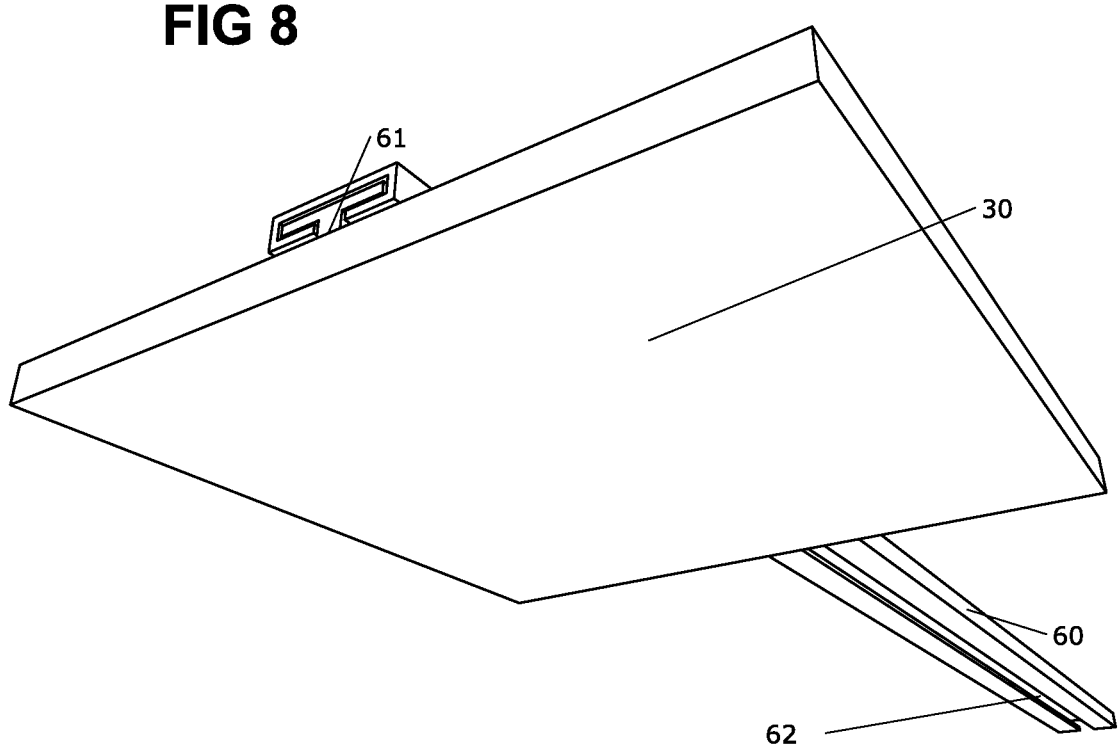

FARADAY ENCLOSURE FOR IMPROVED RFID DETECTION

I. BACKGROUND OF INVENTION

Radio frequency identification (RFID) tags are ubiquitously used to track various objects to which the RFID tags are attached or embedded. There often arises the situation where a large number of RFID tags are placed closely together and in a random orientation, for example, a large number of envelopes (each having its own RFID tag) being placed randomly in a carrying container (e.g., a mail tote). In such situations, there is a high potential for one RFID tag to mask another RFID from the RF interrogation signal, or for certain RFID tags not to be sufficiently energized by the interrogation signal because of the tags' unfavorable orientation. This makes accurate detection of all tags in the container significantly unreliable. A method and apparatus for improving RFID tag detection in general, and of closely packed RFID tags in particular, would be an important improvement in the art.

II. SUMMARY OF SELECTED EMBODIMENTS OF INVENTION

One embodiment of the invention is an RFID reading enclosure having a Faraday cage including a cage floor and a cage hood hinged to the cage floor. The cage hood includes a RF blocking fabric formed on a frame with the interior of the Faraday cage having a volume between 4.5 and 30 ft$^3$. There are at least two RFID antennas positioned to transmit signals into the Faraday cage, with the two RFID antennas having a transmission axis along a different orientation.

Another embodiment is a method of reading a plurality of RFID tagged items in a container. The method includes the steps of (a) placing the container within the above described RFID reading enclosure, (b) performing at least one RFID read cycle using the antennas, and (c) removing the container from the RFID reading enclosure.

III. BRIEF DESCRIPTION OF THE DRAWINGS

FIG. 5 is a close-up view of the RF blocking fabric folded around a frame member of the Faraday enclosure.

FIG. 7 is an inside perspective view of an antenna gantry system in an alternate embodiment of the Faraday enclosure.

FIG. 8 is a more detailed view of the FIG. 7 antenna gantry system.

IV. DETAILED DESCRIPTION OF SELECTED EMBODIMENTS

Figure 1:
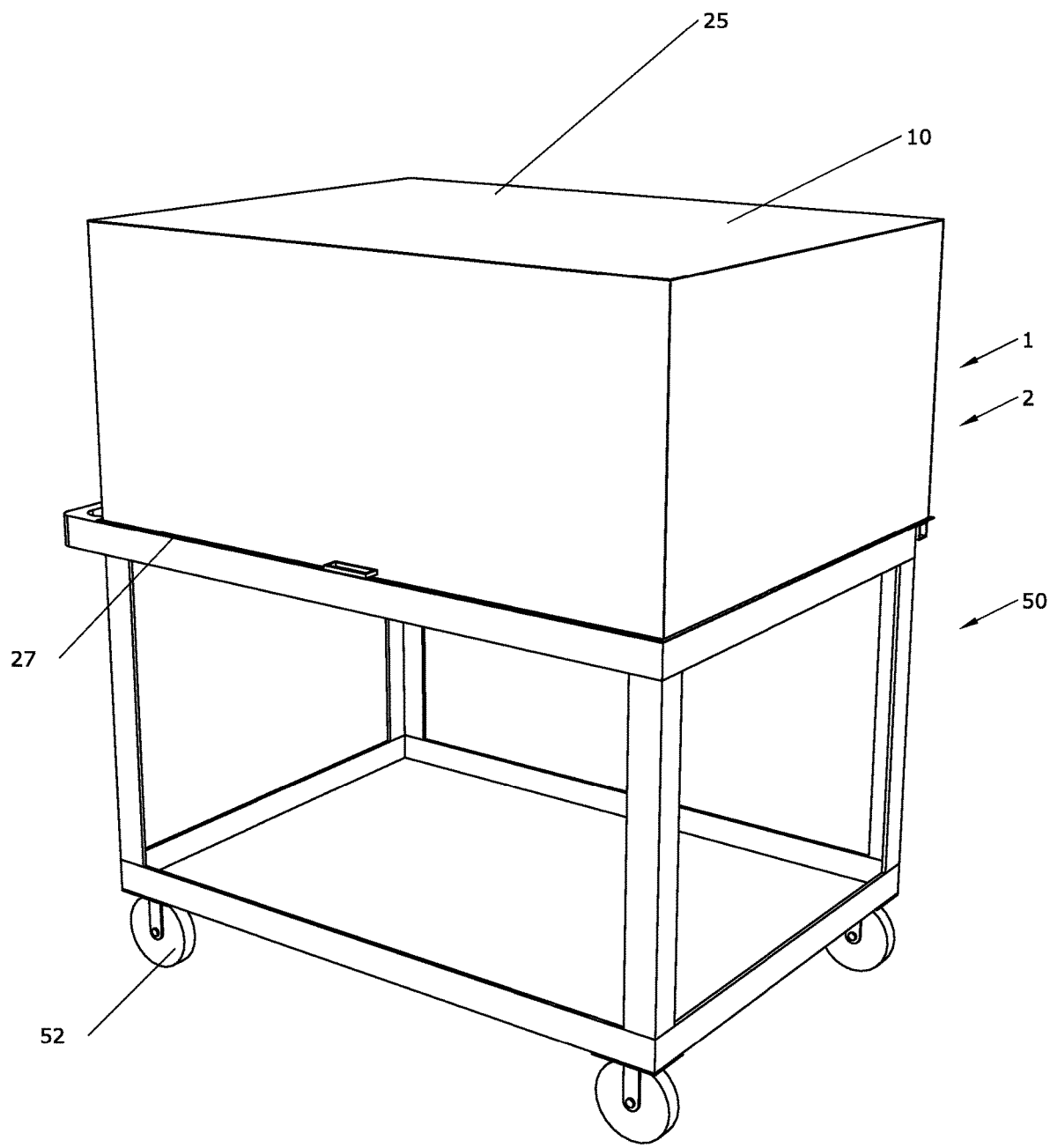
FIG. 1 is a front perspective view of one embodiment of the Faraday enclosure in the closed position.

One embodiment of the Faraday enclosure or RFID reading enclosure 1 is shown in FIGS. 1 to 5. This example of the RFID reading enclosure 1 is most generally formed of the Faraday cage 2 positioned on the base platform 50. In the embodiment of FIG. 1, the base platform is formed of a cart having wheels 52. In preferred embodiments, the base platform will elevate the floor or bottom of the Faraday cage somewhere between about 24 and 48 inches above the surface on which the base platform rests (e.g., a floor of the room containing the RFID reading enclosure 1). The height of the based platform 50 is intended to allow boxes and other containers having a multitude of RFID tagged packages to be easily positioned within the Faraday cage 2 as discussed below. In other embodiments, the Faraday cage 1 could be placed on a desk or some other conventional furniture surface not having wheels. The Faraday cage 1 could also be placed on the floor of the room it occupies, although this would generally be a less convenient configuration. In the typical embodiment, the RFID tags on items within the cage will be the "passive" type. However, there may also be embodiments where the RFID tags are the active type, or some mix of items carrying either active or passive RFID tags.

Figure 2:
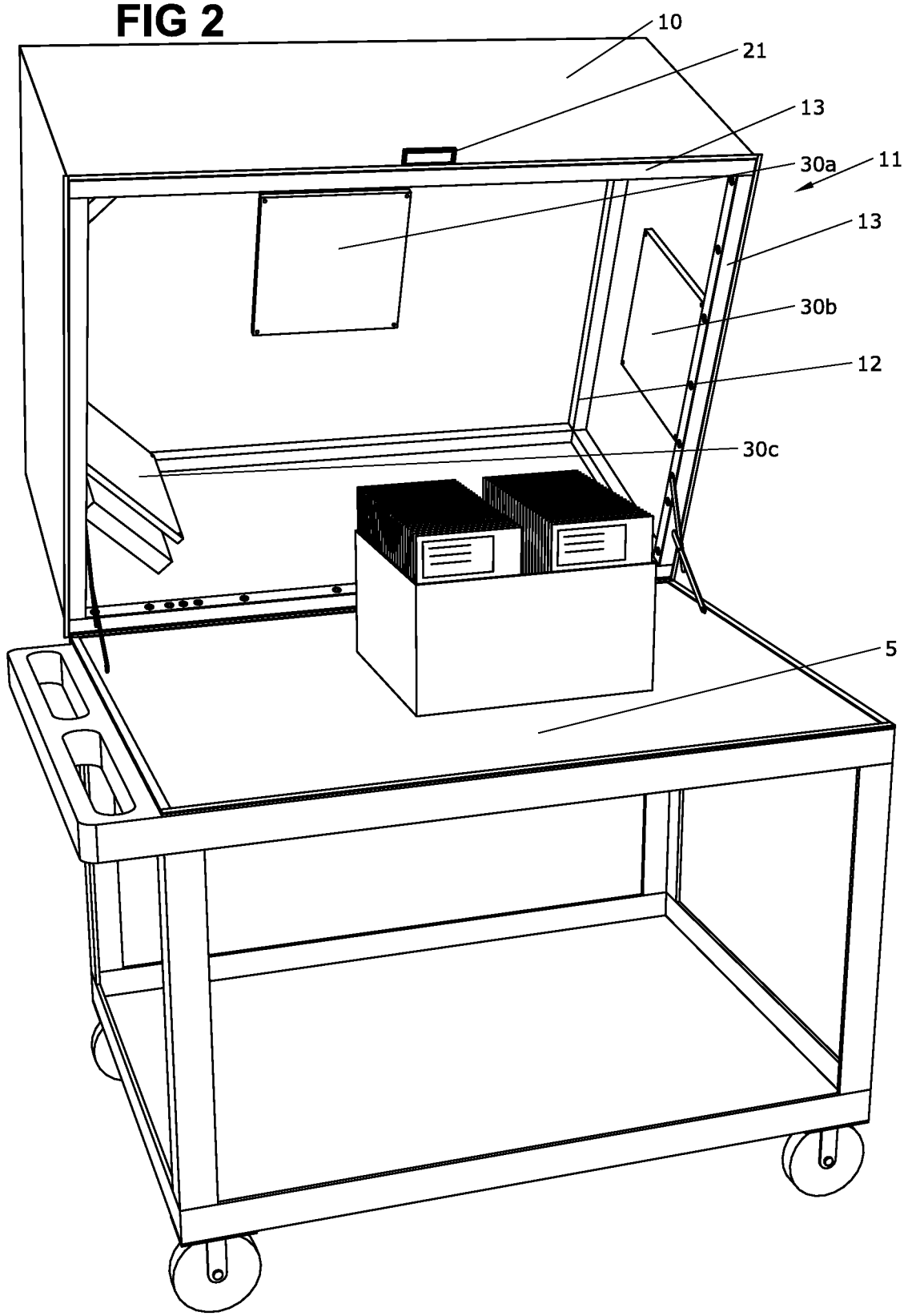
FIG. 2 is a perspective view of the FIG. 1 Faraday enclosure in the open position.

FIG. 2 shows how Faraday cage 2 is principally formed by cage floor 5 and the cage hood 10 which opens and closes over cage floor 5. Cage floor 5 is preferably formed of a metal sheet sufficiently rigid to support the weight of the Faraday cage 2 and having at least a moderate degree of conductivity, e.g., a conductivity of at least $5\times10^5$ σ(S/m) In one example, the floor is formed from a sheet of ⅛" stainless steel. However, the cage floor could be formed of any material sufficiently conductive to substantially eliminate the electromagnetic potential difference (i.e., allow grounding) between the interior and exterior of the Faraday cage. As another nonlimiting example, the cage floor could be a polymer material formed around a wire mesh to provide the material with sufficient conductivity.

Figure 3:
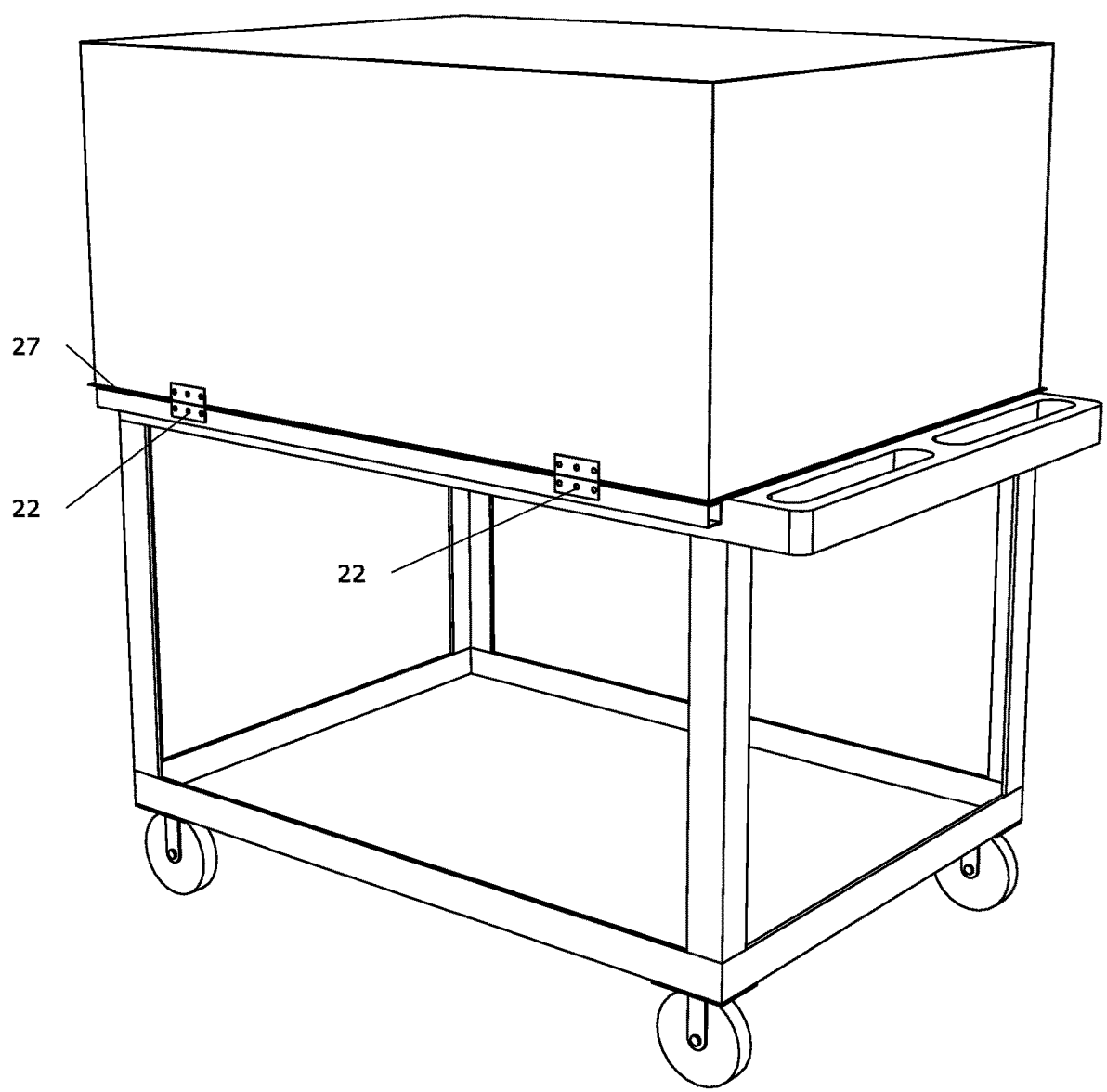
FIG. 3 is a rear perspective view of the FIG. 1 Faraday enclosure in the closed position.

The FIG. 1 embodiment of Faraday cage 2 includes the cage hood 10. As seen in FIGS. 2 and 3, cage hood 10 includes the cage handle 21 on a "front" side and hinges 22 on a "rear" side of the cage hood 10 (as shown in FIG. 3). In one embodiment, a length of square aluminum tubing (1"×1") is bolted to the rear of cage floor 5 and the hinges 22 attach between the square tubing and frame members of the cage hood 10. As suggested by FIG. 2, this configuration connects the cage hood to the cage floor along the rear side of the cage floor, allowing the hood to pivot between an open cage position in FIG. 2 and a closed cage position in FIG. 1. If the cage floor plate is not sufficiently rigid to avoid bowing, aluminum tubing may be bolted along the bottom perimeter and across the bottom center of the cage floor plate to resist bowing. Bowing of the cage floor plate is preferably avoided since bowing tends to cause gaps between the cage hood and the cage floor and allows leakage of RF signals.

Figure 4:
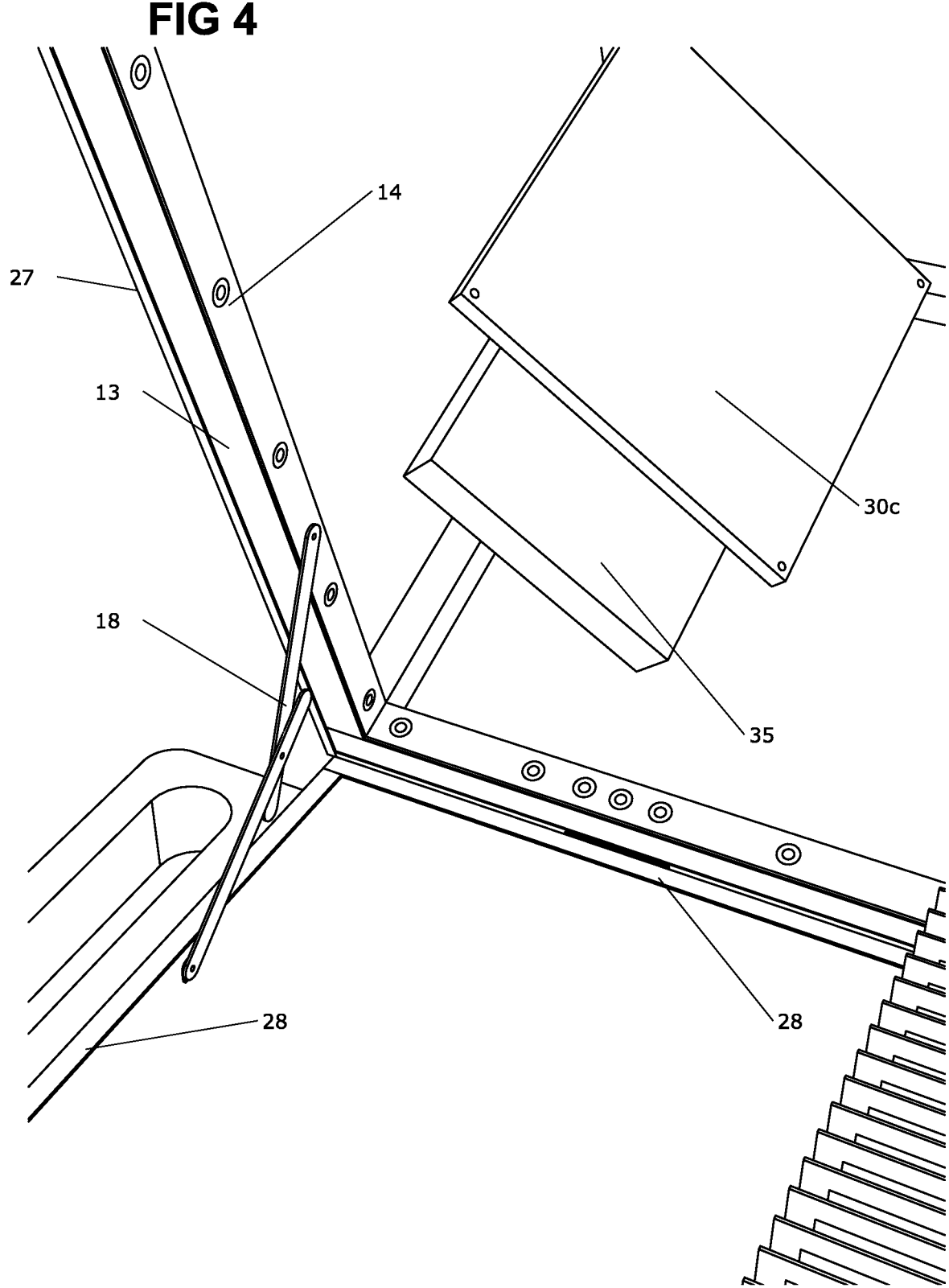
FIG. 4 is a close-up view of a hinge bracket utilized in the FIG. 1 Faraday enclosure.

FIG. 2 also illustrates the cage frame 11 formed by a series of frame members 12. It can be seen in FIG. 2 that the frame members 12 form a rectangular box structure (i.e., cage frame 11) including the bottom frame members 13. In one embodiment, frame members 12 are formed from 1" square aluminum tubing sections, but could be formed of non-tubular and/or nonmetal frame members. In example embodiments, the cage frame will have a width between 18" and 36", a length between 24" and 60", and a height of between 18" and 24". This corresponds to an internal cage volume of between about 4.5 and about 30 ft$^3$ (although other embodiments could be any volume range between about 1 and about 50 ft$^3$). FIG. 4 suggests how hinge brackets 18 may connect between the bottom frame members 13 and the cage floor. As is known in the art, hinge brackets 18, once extended to the open position, may support the weight of the cage hood in the open position. However, downward force on the handle 21 allows the hinge brackets to fold into their hood closed position.

An RF blocking fabric 25 (see FIG. 1) is fitted to cage frame 11. In one embodiment, RF blocking fabric 25 may be conventional nickel-copper RF blocking or shielding fabric such as RF Isolation Fabric available from MWT Materials, Inc. of Passaic, N.J. However, many alternative RF blocking materials could be used. For example, foil-like materials having sufficient tensile strength could be employed, as could metal sheets, although the weight of metal sheets would generally be considered a disadvantage. In certain preferred embodiments, the RF blocking fabric will be sufficient to ensure the cage hood has a shielding effectiveness of at least 90 db in the frequency range between 500 MHz and 2.5 GHz, more preferably 800 MHz and 1100 MHz, or most preferably 900 MHz and 927 MHz.

In a preferred embodiment, the RF blocking fabric may be attached to frame members 12 by grommets (e.g., ⅛" metal grommets) through which 6-32×½" screws are inserted before threading into frame members 12. In preferred embodiments, the cage hood is formed by five panels of RF blocking fabric sewn together with the seams connecting the panels being overlapped and double stitched to minimize or eliminate any gaps through which RF radiation could enter or exit the cage hood. FIGS. 4 and 5 suggest how in a preferred embodiment, the RF blocking fabric is wrapped around the bottom frame members 13 such that the RF blocking fabric extends around three sides of the bottom frame members 13 with the grommets on an inside perimeter 14 of the bottom frame members, i.e., the grommets are not on the bottom surface of bottom frame members which close against cage floor 5. This attachment technique allows the RF blocking fabric to be stretch tightly over this bottom surface of the bottom frame members such that there are no "wrinkles" in the fabric which would prevent a tight fit between the fabric on the bottom frame members and the cage floor (or the magnetic strips disclosed below). Avoiding such "wrinkles" has been found to significantly reduce RF energy "leakage" between the cage hood and the cage floor. In one particular embodiment, the fabric surface engaging the cage floor has no wrinkles greater than 3 mm in height, and preferably no greater than 1 mm in height. FIG. 5 also shows a skirt section 27 formed by the RF blocking fabric along the lower perimeter of the cage hood. As suggested in FIG. 1, skirt section 27 will tend to extend outwards and somewhat downwards over the edge of cage floor 5 when the cage hood 10 is in the closed position. Although other embodiments could readily eliminate this skirt section.

The embodiment seen in FIG. 4 includes a magnetic strip 28 positioned around the perimeter of the cage floor where the bottom frame members engage the cage floor. This magnetic strip acts to bias the RFID blocking fabric on the bottom frame members into tight contact with the cage floor, thereby reducing the possibility of RF radiation entering or exiting at the junction of the bottom frame members and the cage floor. As a less preferred alternative to using this magnetic strip, the weight of the cage hood could be increased (for example with heavier frame members) or springs could be used to bias the cage hood in the closed position. Regardless of what biasing technique is used, preferred embodiments will be configured to require between about 2.5 and 25 pounds of vertical force on the cage handle 21 to lift the hood. Use of the magnetic strips or biasing springs are examples of the bottom frame members being biased against the cage floor by a force greater than merely the weight of the cage cover.

Returning to FIG. 2, it can be seen that a plurality of RFID antennas are positioned within cage hood 10 in the illustrated embodiment. Generally, the RFID antennas are positioned on internal sides of the cage hood in order to transmit signals toward a center area of the Faraday cage (i.e., where the RFID tagged objects will be positioned). A first antenna 30a is oriented with a transmission axis directed from a ceiling of the cage hood downward in a direction substantially normal to a plane of the cage floor. A second antenna 30b is oriented with a transmission axis directed essentially sideways in the cage hood. In other words, sideways being substantially parallel to (1) two sides of the cage hood and (2) the plane of the cage floor. A third antenna 30c is oriented with a transmission axis directed parallel to the plane of the cage floor, but at an angle of about 45 degrees to the transmission axis of the second RFID antenna 30b. Although not seen in FIG. 2, FIG. 6B suggests this embodiment could include a fourth antenna 30d mounted in the top of the cage hood and oriented with a transmission axis directed downward toward the center of the floor and at an angle of about 45 degrees with respect to the plane of the floor. In most embodiments, the term "transmission axis" of an antenna means the axis along which the largest amount of RF energy is transmitted from the antenna. In many embodiments, it is most practical to mount the RFID reader inside the Faraday cage. FIG. 4 suggests how the RFID reader 35 is located between the RFID antenna 30c and an interior wall of the hood. Typically one RFID reader 35 can receive signals from multiple antennas, but there may be embodiments where it is advantageous to utilize more than one RFID reader within a single Faraday cage.

Figure 6A:
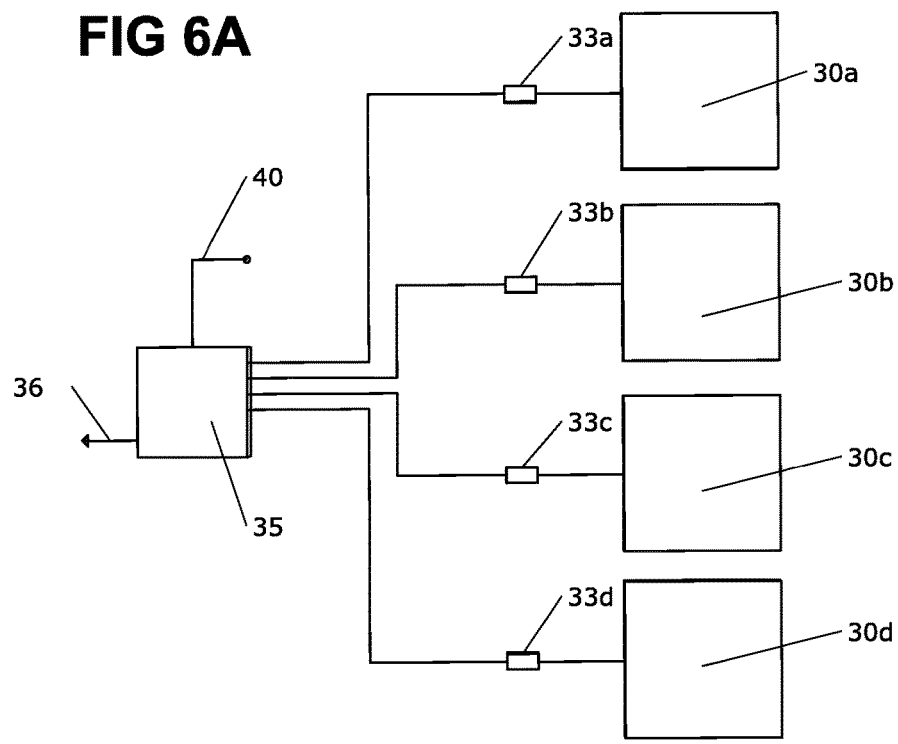
FIG. 6A is a circuit diagram of one embodiment the RFID reader and antennas.
Figure 6B:
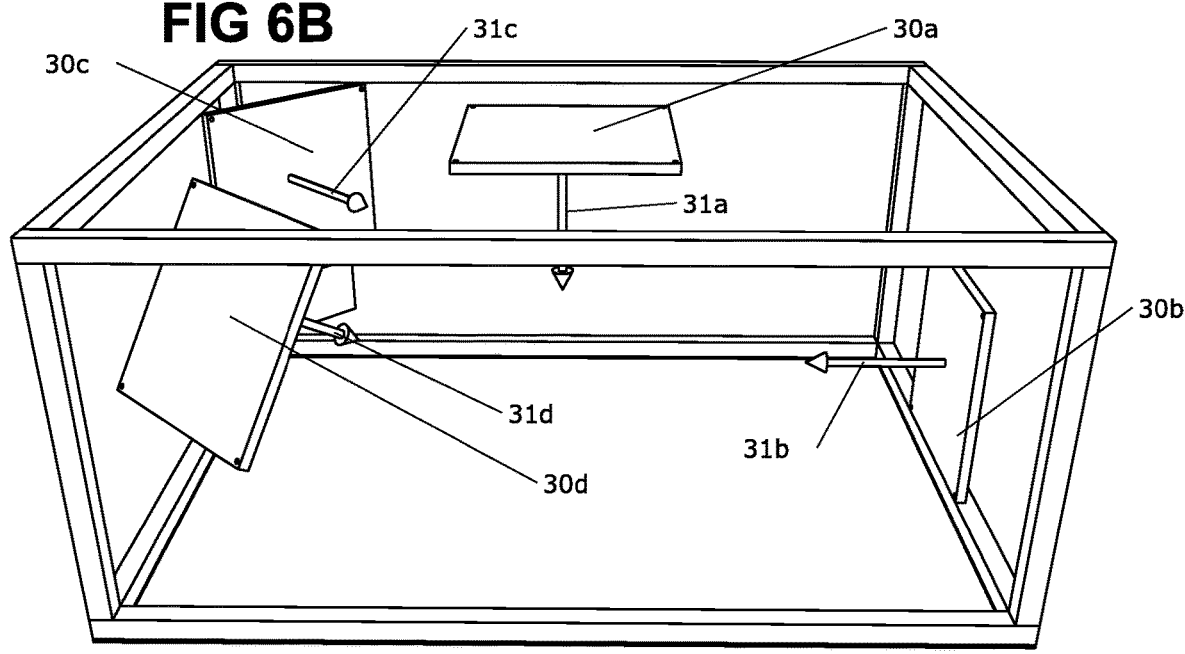
FIG. 6B is a schematic representation of antenna positioning in one embodiment of the cage hood.

In preferred embodiments, the antennas are configured with circular polarization, but certain embodiments could be configured for linear polarization. Additionally, preferred embodiments will have the signals received by the antennas directed through a polarization filter. One example of such a polarization filter is a quadrature coupler. FIG. 6A illustrates schematically the antennas 30, polarization filters 33, and reader 35. Typically, ground leads 40 will extend from the hinges, the cage handle, or any other conductive cage surface capable of emitting RF energy, to the RFID reader 35, which acts as the local grounding point. Although the precise grounding arrangement could vary among embodiments, the important feature is that all conductive structure of the cage ultimately shunt to ground. A multiconductor cable 36 provides power to the RFID reader 35 and transmits signals two and from a main system processor (not shown), e.g., a conventional computer running software for interfacing with the RFID reader.

It will be understood that it is not strictly necessary for the RFID antennas to be completely inside the cage hood 10, but the antennas could conceivably be positioned outside the cage hood with windows through the RF blocking fabric. However, this configuration does substantially increase complexities in fabricating the cage hood.

One preferred method of utilizing the Faraday enclosure is to read RFID tags in a container having a large number of RFID tagged items positioned within the container. Normally this container will be formed of a nonmetal material to allow the passage of RF signals. As one example, a law enforcement evidence room may have a large number of envelopes containing evidence and each envelope has an associated RFID tag. A large number of these envelopes (e.g., 25 to 500) may be placed in a single plastic bin or cardboard box as part of the process of checking in or checking out these items of evidence. FIG. 2 suggests a box filled with envelopes having RFID tags attached to the envelopes. In this method, the container having the RFID tagged items is place within the Faraday cage or enclosure, i.e., the cage hood is lifted, the container placed on the cage floor, and then the cage hood is lowered to the closed position. Next, at least one RFID read cycle is performed using each of the antennas. As used herein, "RFID read cycle" means the RFID reader transmitting a query signal through the first antenna and then receiving at the antenna the reflected signals from the RFID tags. The read cycle then typically continues repeating this process with any addition antennas connected to the RFID reader. Then the container is removed from the Faraday cage. In some instances, it may be beneficial after one or more RFID read cycles for the worker performing the method to lift the cage hood, shuffle the RFID tagged envelops in the container, and then conduct at least one further RFID read cycle (prior to the container being removed from the enclosure). As an alternative to shuffling the envelopes in the container, the container could just be rotated 90° or a 180° before subsequent RFID read cycles.

The RFID reader and antennas may be any conventional or future developed RFID hardware. In one example the RFID reader is an Alien F800 reader and the antennas are SensThys SensRF 1010 antennas. RFID readers typically have the onboard processing capacity and software to generate a listing of RFID tag numeric identifiers detected in the read cycle and then export this list of detected RFID tags to a conventional laptop or desktop computer, which will utilize the list with conventional object tracking software.

Although FIGS. 1-6 suggest an embodiment with multiple RFID antennas within the Faraday cage enclosure in order to direct signals along different transmission axes, FIGS. 7 and 8 suggest an embodiment for a single antenna directing signals along different transmission axes. FIG. 7 shows a cage hood 10 with a gantry 60 fixed to frame members (not shown) in the cage hood. FIG. 8 shows how the antenna 30 is fixed to the bearing 61 which engages and slides along the slot 62 in gantry 60. An electric motor (also not shown) would be configured to selectively move antenna 30 along the length of gantry 60. Typically, the RFID reader would perform one read cycle with the antenna in a first position. Then the antenna would move to a second position for a second read cycle, with this process continued for the number of antenna positions consider necessary. In this manner, a single antenna 30 could be configured to transmit signals along multiple different transmission axes. Although FIG. 7 only shows a signal gantry and antenna on the top interior surface of cage hood 10, those skilled in the art will readily see how a second gantry and antenna could be installed on an interior sidewall of the cage hood 10.

A still further embodiment could consist of a single antenna fixed in a stationary position within the Faraday cage interior. However, this single, fixed antenna embodiment increases the likelihood of having to rotate the container and/or shuffle its contents in order to read substantially all RFID tags in the container.

As used herein, the use of the terms "substantially" or "about" means a variation of no more than 20% of the value modified by those terms, and in some embodiments means a variation of less than 15%, 10%, 5%, or 2.5%. Although the invention had been described in terms of certain specific embodiments illustrated in the drawings, those skilled in the art will see many obvious modification and variations which are intended to be encompassed by the scope of the following claims.

The invention claimed is:

1. An RFID reading enclosure comprising:
   (a) a Faraday cage including a cage floor and a cage hood hinged to the cage floor along a side of the cage floor, thereby allowing the hood to pivot between an open cage position and a closed cage position;
   (b) wherein the cage hood includes (i) a RF blocking fabric formed on a frame, (ii) at least one hinge on a first side, and (iii) a handle on an opposing second side;
   (c) wherein the cage hood is configured to require between about 5 and 15 pounds of vertical force to lift the cage hood;
   (d) wherein an interior of the Faraday cage has a volume between 4.5 and 30 ft$^3$; and
   (e) at least two RFID antennas positioned to transmit signals into the Faraday cage, each of the two RFID antennas having a transmission axis and the two transmission axes having different orientations.

2. The RFID reading enclosure of claim 1, wherein the cage floor is formed of a conductive metal sheet.

3. The RFID reading enclosure of claim 2, wherein the frame includes bottom frame members engaging the cage floor when the hood is in the closed cage position and the RF blocking fabric extends around three sides of the bottom frame members.

4. The RFID reading enclosure of claim 3, wherein a magnetic strip biases the bottom frame members into contact with the cage floor.

5. The RFID reading enclosure of claim 4, wherein the magnetic strip is positioned on the cage floor along a perimeter where the bottom frame members engage the cage floor.

6. The RFID reading enclosure of claim 1, further comprising three RFID antennas positioned to transmit signals into the Faraday cage.

7. The RFID reading enclosure of claim 1, wherein the RFID antennas are located within the Faraday cage.

8. The RFID reading enclosure of claim 1, wherein the cage hood has a shielding effectiveness of at least 90 db in the frequency range between 500 MHz and 2.5 GHz.

9. The RFID reading enclosure of claim 1, wherein signals received by the antennas are directed through a polarization filter.

10. The RFID reading enclosure of claim 1, wherein (i) a first RFID antenna is oriented with a transmission axis directed from a ceiling of the cage hood substantially normal to a plane of the cage floor; (ii) a second RFID antenna is oriented with a transmission axis directed substantially parallel to (1) two sides of the cage hood and (2) the plane of the cage floor; and (iii) a third RFID antenna is oriented with a transmission axis directed at about 45 degrees to the transmission axis of the second RFID antenna.

11. A method of reading a plurality of RFID tagged items in a container, wherein the plurality of RFID tagged items exceeds 50 items, the method comprising the steps of:
   (a) placing the container within an RFID reading enclosure, the RFID reading enclosure including:
      (i) a Faraday cage including a cage floor and a cage hood hinged to the cage floor along a side of the cage floor, thereby allowing the hood to pivot between an open cage position and a closed cage position;
      (ii) wherein the cage hood includes a RF blocking fabric formed on a frame;
      (iii) wherein an interior of the Faraday cage has a volume between 2.5 and 35 ft$^3$; and
      (iv) at least two RFID antennas positioned to transmit signals into the Faraday cage, each of the two RFID antennas having a transmission axis and the two transmission axes having different orientations;
(b) performing at least one RFID read cycle using the antennas;
(c) opening the enclosure, shuffling the items within the container and/or changing the orientation of the container; and
(d) performing at least one further RFID read cycle prior to the container being removed from the enclosure.

12. The method of claim 11, wherein the container is substantially nonmetal in its construction.

13. The method of claim 11, wherein the RFID read cycles are implemented as part of a law enforcement evidence room check-in or check-out procedure.

14. The method of claim 11, wherein a lower perimeter of the cage hood is biased against the cage floor.

15. The method of claim 11, wherein a surface of the fabric engaging the cage floor has no wrinkles greater than 3 mm in height.

16. The method of claim 11, wherein a magnetic strip biases the bottom frame members into contact with the cage floor.

17. The method of claim 11, wherein the hood is configured to require between about 5 and 15 pounds of vertical force to lift the hood.

18. The method of claim 11, wherein (i) a first RFID antenna is oriented with a transmission axis directed from a ceiling of the cage hood substantially normal to a plane of the cage floor; (ii) a second RFID antenna is oriented with a transmission axis directed substantially parallel to (1) two sides of the cage hood and (2) the plane of the cage floor; and (iii) a third RFID antenna is oriented with a transmission axis directed at about 45 degrees to the transmission axis of the second RFID antenna.

19. The method of claim 11, wherein a majority of the RFID tagged items are tagged with passive RFID tags.

20. An RFID reading enclosure comprising:
(a) a Faraday cage including a cage floor and a cage hood, wherein the cage hood is configured to move between an open cage position and a closed cage position;
(b) wherein the cage hood and the cage floor include a RF blocking material;
(c) wherein the Faraday cage in the closed cage position is configured to create a RF seal between the cage floor and cage hood which substantially prevents the escape of RF signals from the Faraday cage;
(d) wherein an interior of the Faraday cage has a volume between 2 and 50 $ft^3$: and
(e) at least two RFID antennas positioned to transmit signals into the Faraday cage, each of the two RFID antennas having a transmission axis and the two transmission axes having different orientations.

21. The RFID reading enclosure of claim 20, wherein a magnetic strip biases the cage hood into contact with the cage floor.

22. The RFID reading enclosure of claim 20, wherein:
(f) wherein the cage hood includes a RF blocking fabric formed on a frame;
(g) wherein the cage hood is configured to require between about 5 and 25 pounds of vertical force to lift the cage hood; and
(h) wherein an interior of the Faraday cage has a volume between 4.5 and 30 $ft^3$.

* * * * *